United States Patent

[11] 3,599,992

[72] Inventor John H. Kammeraad
Holland, Mich.
[21] Appl. No. 37,385
[22] Filed May 7, 1970
[45] Patented Aug. 17, 1971
[73] Assignee K-Line Tool Co.
Holland, Mich.
Continuation of application Ser. No.
675,586, Oct. 16, 1967, now abandoned.

[54] VALVE SEAL
7 Claims, 4 Drawing Figs.
[52] U.S. Cl. .................................................. 277/48,
277/181, 277/189, 123/188
[51] Int. Cl. ................................................... F16j 15/00,
F16k 41/00
[50] Field of Search ....................................... 277/48,
189, 187, 178, 80, 184, 181; 123/188 P

[56] References Cited
UNITED STATES PATENTS
487,434 12/1892 Steen ........................... 287/126 UX

| 2,348,586 | 5/1944 | Antonelli | 277/184 X |
| 3,128,105 | 4/1964 | Lieng | 277/187 |
| 3,379,445 | 4/1968 | Fisher | 277/178 |
| 3,450,411 | 6/1969 | Skinner, Sr. | 277/48 |

FOREIGN PATENTS
| 728,823 | 4/1955 | Great Britain | 277/33 |
| 953,305 | 3/1964 | Great Britain | 277/184 |

Primary Examiner—Samuel Rothberg
Attorney—Price, Heneveld, Huizenga & Cooper

ABSTRACT: A valve seal particularly adapted for utilization in conjunction with an overhead valve engine having a preformed seal member of filled polytetrafluoroethylene embossed or extruded to a generally a frustoconical shape and embodying an aperture through which the valve stem is adapted to slide. The seal is retained in position above the valve guide by means of a pair of washers which sandwich the edge of the seal together and are in turn retained by a boot having a deformable indent adapted to telescopically engage the exposed shoulder of the valve guide.

PATENTED AUG 17 1971

3,599,992

INVENTOR.
JOHN H. KAMMERAAD
BY
ATTORNEYS

VALVE SEAL

This application is a continuation of application Ser. No. 675,586, filed Oct. 16, 1967, now abandoned.

BACKGROUND

This invention relates to seals and, more particularly, to a seal and a combination seal and retainer mechanism particularly adapted for controlling the rate of oil flow through the valve guide of an engine.

Internal combustion engines generally incorporate a series of reciprocating valves for permitting entry of the combustion mixture into the cylinder as well as exhaust of the remnant gases therefrom. These valves are generally slidably supported in valve guides in the cylinder head of the engine and are biased to a closed position by means of a compression spring as is well known in the art. The valves are actuated in proper chronological sequence by means of rocker arms, cams or the like which function to depress the valve stem against the force of the closing spring to permit either entry of the combustion mixture into the cylinder or exhaust of combusted gases therefrom.

Because of the continual mechanical interaction between the rocker arms and the valve stems, it is necessary to provide a bath of oil surrounding these particular components as a means of minimizing wear during operation of the engine. It is necessary and desirable, additionally, to permit relatively small portions of this oil to pass into the valve guide to lubricate it and, thus, prevent excessive wear on the valve guide as well as the valve stem which is reciprocating therein. It is highly undesirable, on the other hand, to permit excess quantities of oil to gain access to the interior of the valve guide, since such quantities of oil will leak into cylinder at alarming rates, causing excess oil usage within the engine as well as poor operating characteristics.

It has become customary, thus, in the internal combustion engine art to provide a seal on one sort or another around the valve stem immediately above the valve guide. The seal is retained to the valve guide ordinarily by means such as a rubber boot, magnet or the like. Ideally, the seal functions to prevent excess quantities of oil from entering the valve guide and, thus, the combustion chamber and, yet, permits a sufficient amount of lubricant to enter the valve guide to prevent excessive wear of the valve stem and guide within such it is reciprocably mounted.

A rather large number of differing types of seals and retainer means therefor have been proposed heretofore. Each of these prior art proposals, insofar as Applicant is aware, have suffered from any one or more of a number of disadvantages, which disadvantages have required that the seals be replaced intermittently throughout the life of the engine and, in some cases, that the valves and valve guides be replaced or reworked in order to maintain satisfactory operating characteristics.

OBJECTS

It is an object of this invention, therefore to provide a seal of the type described which will function, effectively, to restrict the flow of oil into the valve guide within desirable limits.

It is an object of this invention, additionally, to provide a seal which will function correctly over an extended period of time and use and, thus, which will markedly improve the long term operating characteristics of the engine into which it is installed.

It is yet another object of this invention to provide a seal which may be positively and easily installed in a new or reconditioned engine in such a manner as to minimize any chance of harming the seal during such procedure.

It is also an object of this invention to provide a novel seal and retaining boot combination, the retaining boot functioning to hold the seal in proper position within the engine.

These as well as other objects of this invention will be readily understood with reference to the following specification and accompanying figures in which.

Briefly, this invention comprises a oil seal for a valve stem reciprocating in a guide comprising a preformed plastic member having a generally flat, radially extending portion and a converging axially extending portion. The axial extending portion incorporates an aperture adapted to slidingly receive the valve stem. Means are provided for retaining the radially extending portion, and, thus, the sealing member in fixed spatial relationship with respect to the guide.

In its more limited aspects, this invention comprises additionally the combination of the seal described above and a retaining boot comprising a tubular base member adapted to fit telescopically over the exposed shoulder portion of the guide. The base member has a deformable indent extending inwardly from the sidewall thereof to engage the shoulder portion of the valve guide. The indent is adapted to deform upon telescopic engagement of the base member and the shoulder portion to accommodate minor variations in the peripheral measurements of the valve guide and, thus, to insure proper engagement of the base members thereto.

Figure 1:
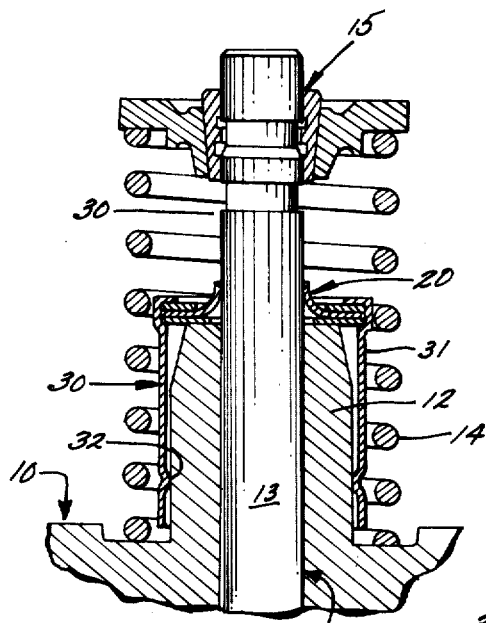
FIG. 1 is a side-elevational view, partially in cross section, of a typical valve and guide structure having installed thereon in operative position the novel seal which is the subject of this invention.

Referring now to the figures, a preferred embodiment of this invention will be described in detail. FIG. 1 illustrates a typical overhead valve engine head 10 having machined therein a valve guide 11. Valve guide 11 has an exposed shoulder portion indicated generally by the reference numeral 12 through which the valve stem 13 is passed during assembly. Ordinarily, the exposed shoulder 12 will be integrally cast with the remainder of the head and thereafter machined to proper dimension. A valve spring 14 encircles exposed shoulder portion 12 of the valve guide assembly and the valve is conventionally retained with respect thereto by a pair of valve keepers 15. While not shown, of course, the valve stem 13 extends downwardly as illustrated in FIG. 1 and terminates in a valve portion having a suitable seat machined into the lower surface of the head 10. The valve spring 14 retains the valve in closed position with respect to the seat except when forced downwardly by a rocker arm or the like in proper operational sequence.

The striking of the rocker arm against the upper surface of the valve and the reciprocation of the valve stem within the guide require that oil be supplied to the upper section of the valve stem. This is accomplished usually by means of an oil passage in the rocker arms, the upper surface of the head forming a reservoir into which the oil flows for return to the oil pump. Pumping of the oil over the upper section of the valve stem necessitates, of course, the provision of an oil seal to prevent undesirable quantities of oil from flowing between the valve stem 13 and the valve guide 11 into the combustion chamber of the engine.

Figure 4:
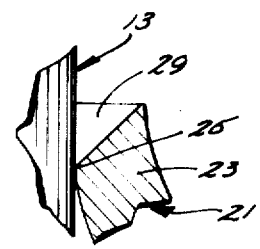
FIG. 4 is a fragmentary, side-elevational view, partially in cross section, illustrating the mode of contact between the seal and the valve stem.
Figure 2:
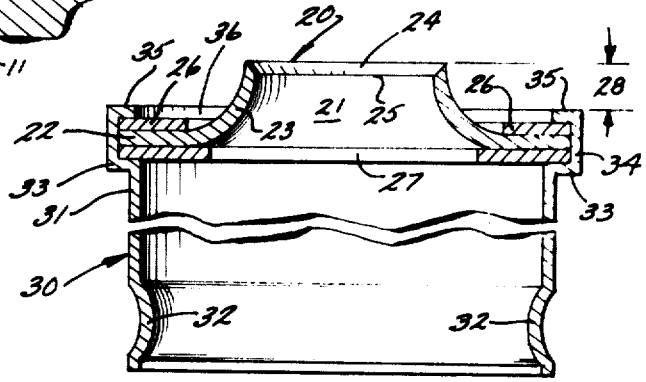
FIG. 2 is a sectional, side-elevational view of the seal structure.
Figure 3:
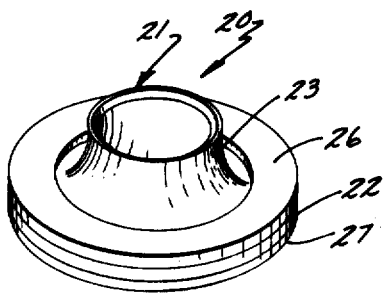
FIG. 3 is a perspective view of the sealing member and compression washers.

Referring now additionally to FIGS. 2 through 4, the novel seal indicated generally by the reference numeral 20 which forms one of the subjects of this invention, comprises a plastic member 21 having a radially extending portion 22 and a converging axially extending portion 23. Axially extending portion 23 terminates in an aperture 24 which, as illustrated particularly in FIG. 4, provides a knife edge contact against the reciprocating valve stem 13. Limited area contact of this type substantially enhances the wearing characteristics of the seal.

The radially extending portion 22 of the plastic member 21 is sandwiched between an upper retaining washer 26 and a lower retaining washer 27. In accordance with the teachings of the preferred embodiment of this invention, the sandwich is retained in compressive abutment by means of the retaining boot assembly 30. More particularly, the retaining boot assembly 30 comprises a tubular base member 31 adapted to telescopically engage the outer diameter of the valve guide 12.

In accordance with the teachings of application Ser. No. 627,206, filed Mar. 30, 1967 and assigned to the same assignee as the instant invention, the tubular base member is provided with a deformable indent 32 which functions, upon telescopic engagement of the base member and the valve guide, to deform to accommodate minor variations in the peripheral measurements of the exposed shoulder portion 12 of the valve guide 11. The particular characteristics of the tubular base member 31 and the deformable indent 32 are described in detail in the noted copending application, which application is specifically incorporated by reference herein.

The tubular base member 31 terminates at its upward reach in a circumferential shoulder 33. It is thereafter expanded as indicated at 34 to form a seal-enveloping sidewall and a compression lip 35. As shown best in FIG. 2, the seal assembly components comprising the plastic member 21 and the upper and lower retaining washers 26 and 27, respectively, rest on the peripheral shoulder 33 and are retained in compressed relationship with respect to one another by the folded-over compression lip 35.

As pointed out in detail in the copending application noted previously, the seal may thereafter be inserted easily on a new or reconditioned engine by merely forcing the tubular base 31 over the exposed shoulder portion of the valve guide. It is desirable during insertion of the valve stem, of course, to place an installation sleeve over the valve keeper peripheral recesses in the stem in order to prevent damage to the seal. The base member 31 is forced downwardly a sufficient distance to bring the lower retaining washer 27 into overlying abutment with the upper surface of the valve guide 12.

The plastic member 21 is formed preferably from a filled fluorocarbon such as polytetrafluoroethylene. The filler may, for example, be bronze or graphite, such materials being available in the form of tape from a number of different sources. The filling of the material markedly improves the wear characteristics of the finished seal as well as other properties such as heat conductivity and the like.

The plastic sealing members 21 may be fabricated by running a continuous tape of stock through a suitable embossing or extruding machine and thereafter stamping the OD's of the individual seals. This may be accomplished in a "cold" embossing process. The sealing member 21 is then sandwiched between the proper retaining washer, placed in resting position upon the shoulder 33 of the retaining boot and the compression lip 35 of the boot rolled over to retain the seal and boot combination in assembled fashion.

It has been proposed, heretofore, to utilize a valve seal fabricated from polytetrafluoroethylene. More specifically, in U.S. Pat. No. 3,306,621, there is illustrated a seal fabricated from this material. In this patent, however, the seal is not preformed, embossed or extruded to the general frustoconical configuration shown in FIG. 3 prior to its installation into the engine. Consequently, it is extremely difficult to properly install the seal without damaging its inner working surface or, for that matter, without distorting the concentricity of the finished assembly. This invention contemplates, therefore, the preembossing or forming of the seal into the generally frustoconical shape illustrated in FIG. 3 on an embossing machine or the like prior to installation into the engine. Such preembossing, in addition to providing for positive and speedy installation, also aids materially in the proper functioning of the seal during operation of the engine.

From an examination of FIG. 2, it will be noted that the inside diameter of the lower retaining washer 27 is somewhat less than that of the upper retaining washer 26. The frustoconical configuration of the seal permits the valve to close—i.e. the valve stem to move upwardly as viewed in FIG. 1—with little strain on the plastic sealing member, the inherent flexibility and "memory" of the plastic permitting a self-centering action during movement in this direction. On the valve-opening or downstroke, however, it is necessary to support the plastic sealing member 21 across a greater percentage of its area to prevent any tendency for the plastic sealing member to invert or be otherwise damaged. Thus, the relative sizes of the compression washers 26 and 27 permit the seal to compensate for any wobble tendency of the valve stem caused by relative wear between the guide and stem during the valve-closing stroke and, yet, effectively support the seal on the opening stroke. The relative sizes, additionally, permit the seal to center properly despite the presence of slight irregularities in the concentricity of the valve guide and retaining shoulder OD.

It will be noted, additionally, from an examination of FIG. 2 that the relative dimensions of the seal structure and retaining boot are such that the upper extremity of the plastic sealing member 21 is disposed well above (a distance 28) the surrounding structure of the retainer and seal. Such placement prevents oil which builds up in the area 36 (see FIG. 2) between the interior edge of the compression lip 35 and the exterior sidewall of the plastic sealing member to flow over the upper extremity of the sealing member and, thus, down through the valve guide 11 in nonacceptable quantities.

Another of the salient features of the instant invention is the provision of an oil cup 29 (see FIG. 4) adjacent the knife edge contact 25 of the plastic sealing member 21 and the valve stem 13. During the reciprocation of the valve stem, sufficient oil will be wiped ordinarily upon the valve stem to prevent excessive wear in the valve guide and, yet, the knife edge contact at 25 will prevent the flowing of excess quantities of oil into the combustion chamber.

The relative dimensions of the various seal components depend to some extent upon the particular type of engine, plastic and the like. Merely by way of example, it has been found that for a nominal 11/32-inch valve stem, a lower support washer 27 having an inside diameter of three-eighths inch; an upper support washer 26 having an inside diameter of seven-sixteenths inch; and a sealing element having an embossed aperture of one-fourth inch prior to insertion of the stem therethrough and formed from 0.020-inch tape provide satisfactory operating characteristics. Preferably, as noted, the polytetrafluoroethylene or other fluorocarbon material is filled with graphite, bronze or the like in order to improve its wearing characteristics and heat conductivity. The necessity of such filling and the particular type of filler utilized depend, however, on the environmental characteristics of the system into which the seal is to be incorporated.

While a preferred embodiment of this invention has been illustrated in detail, it will be readily apparent to those skilled in the art that other embodiments may be conceived said fabricated without departing from the spirit of this specification and the accompanying drawings. Such other embodiments are to be deemed as included within the scope of the following claims unless these claims, by their language, expressly state otherwise.

The embodiments of the invention in which I claim an exclusive property or privilege are defined as follows.

1. A combination oil seal and seal-retaining means for utilization in conjunction with a valve stem reciprocating in a guide having an exposed shoulder portion, said combination comprising:

an integrally formed, metallic, tubular base member having a tubular sidewall, said member being adapted to fit telescopically over and peripherally envelop the exposed shoulder portion of said guide, said base member having a deformable indent extending inwardly from the sidewall thereof to engage said shoulder portion, said indent extending about the entire periphery of said base member and being adapted to deform upon telescopic engagement of said base member and said shoulder portion to accommodate minor variations in the peripheral measurements of said shoulder portion to insure the engagement of said base member thereto, said base member flaring outwardly at its upper reach to form a peripheral shoulder, then extending upwardly to form a tubular seal enveloping sidewall and then extending inwardly to form a compression lip;

a preformed generally frustoconical plastic seal member of generally uniform thickness having a generally flat, radially extending portion and a converging axially extending portion, said axially extending portion incorporating an aperture therein adapted to slidingly and sealingly receive said stem, said aperture having a smaller diameter than the stem which is to be slidably inserted therethrough prior to such insertion;

a metallic, washerlike element disposed on either side of said radially extending portion of said seal member, said washerlike elements with the seal member positioned therebetween being sandwiched tightly between said shoulder and said compression lip to retain said elements and the radially extending portion of said seal in compressed relationship with respect to one another and in fixed position with respect to said base member.

2. The combination as set forth in claim 1 wherein the edge of said axially extending portion bounding said aperture is disposed transversely with respect to a valve stem around which said combination is installed whereby knife-edge-type contact occurs between said seal and said stem during reciprocation of said stem.

3. The combination as set forth in claim 1 wherein the interior diameter of that element most remote from said stem receiving aperture is less than the interior diameter of the other of said elements.

4. The combination as set forth in claim 3 wherein said axially extending portion extends axially a sufficient distance beyond said tubular base member such that, when said seal is positioned with said axially extending portion oriented upward, said aperture lies above a plane passing through the upper surface of said tubular base member.

5. The combination as set forth in claim 1 wherein said seal member comprises a filled, normally solid, fluorocarbon polymer.

6. The combination as set forth in claim 1 wherein said seal member comprises polytetrafluoroethylene.

7. The combination as set forth in claim 1 wherein said tubular base member retains one of said washerlike elements in generally overlying abutment with the upper surface of said shoulder portion when said combination is installed thereon.